G. A. CURTIS.
WIRE NAIL.
APPLICATION FILED MAR. 9, 1918.
1,298,015.
Patented Mar. 25, 1919.
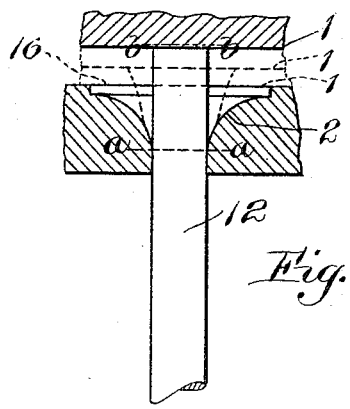
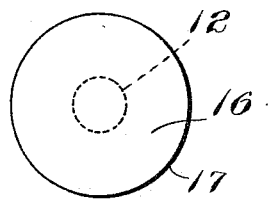
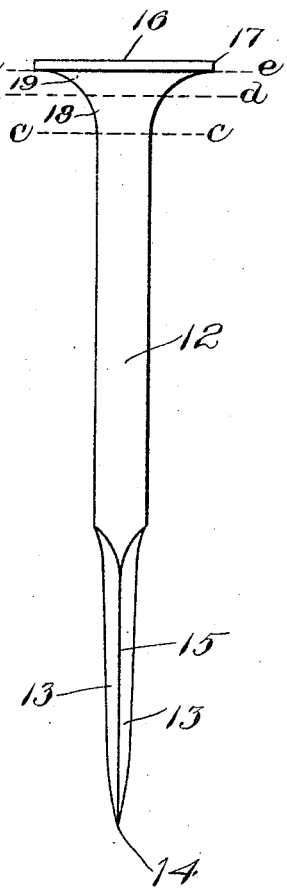
Inventor:
George A. Curtis
By Wright Brown Quinby May
Attorneys

UNITED STATES PATENT OFFICE.

GEORGE A. CURTIS, OF MEDFORD, MASSACHUSETTS.

WIRE NAIL.

1,298,015.   Specification of Letters Patent.   Patented Mar. 25, 1919.

Application filed March 9, 1918. Serial No. 221,447.

*To all whom it may concern:*

Be it known that I, GEORGE A. CURTIS, a citizen of the United States, residing at Medford, in the county of Middlesex and State of Massachusetts, have invented new and useful Improvements in Wire Nails, of which the following is a specification.

This invention relates to a wire nail having a head, a substantially cylindrical shank the diameter of which is determined by the gage of the cylindrical wire of which the nail is made, and a clenching point, the head being formed by upsetting one end portion of the wire to displace the metal of said portion endwise and laterally. The head is formed by suitable dies, and has a flat outer face, surrounded by a narrow substantially circular edge face, and an annular inner face which joins the shank, is tapered therefrom, and joins the edge face.

My improved nail is distinguished chiefly by the form of said annular inner face, which is such as to involve a greater lateral displacement of the metal forming the end and edge faces of the head, and therefore a greater diameter of the outer portion of the head relatively to the gage of the wire, than in wire nails with upset heads heretofore produced.

The invention consists in the improvements which I will now proceed to describe and claim.

Of the accompanying drawings forming a part of this specification,—

Figure 1 is a side view of a wire nail embodying my invention.

Fig. 2 is an end view of the same.

Fig. 3 is a view showing a portion of the wire from which the nail is made, and illustrating by dotted lines the endwise and lateral displacement of a portion of the wire to form the head shown in Fig. 1.

The same reference characters indicate the same parts in all of the figures.

The drawings represent the nail considerably enlarged, especially from the size of nail usually employed for securing rubber to leather in shoe soles, which is one of the uses to which my improved nail is adapted, a shoe nail embodying the invention being usually about one-ninth of the size represented by the drawings. It is obvious, however, that the invention may be embodied in a nail of any size adapted to be made from cylindrical wire.

The diameter of the cylindrical shank 12 of the nail is determined by the gage of the wire employed. Said shank is provided with a clenching portion, which may be of any suitable form. As here shown, the clenching portion has two curved sides 13, a point 14, and angular edges 15 at the intersection of the sides 13 this form of clenching portion being well known.

The head of the nail is formed by upsetting the opposite end portion of the wire composing the nail, namely, the portion between the dotted lines *a—a* and *b—b* (Fig. 3), the metal of said portion being displaced, both endwise and laterally, to form a head having a flat outer face 16, which is substantially circular, and is in a plane at right angles with the shank, a narrow substantially circular edge face 17, and a reëntrant, annular inner face having the characteristics next described.

In the form of nail shown by Fig. 1, the said annular face has an inner zone 18 between the lines *c—c* and *d—d*, and an outer zone 19 between the lines *d—d* and *e—e*, said zones being portions of an annular face which is concave in the plane of the longitudinal axis of the nail, and extends from the shank to the edge face of the head. The inner zone 18 joins the shank and tapers outwardly therefrom, at an inclination involving a relatively small, although progressively increasing lateral displacement of the metal. The outer zone joins the inner zone and the edge face 17, the inclination of the outer zone being such as to involve a greater lateral displacement of the metal, the displacement being sufficient to give the faces 16 and 17 of the head a diameter approximately three times the diameter of the shank.

I have found that by forming the annular inner face of the head as above described, I am enabled to give the outer portion of the head including the faces 16 and 17, a considerably greater diameter in proportion to the gage of the wire from which the nail is made, than in any wire nail heretofore produced, so far as I am aware. I am also enabled to so displace the metal as to impart a substantial thickness or width to the edge face 17, said edge face forming a cylindrical zone between the outer zone 19 and the face 16, so that the flat outer face does not join the annular inner face at a relatively sharp, acute angle. The strength of the outer portion of the head and its resistance to wear are therefore materially increased.

It will be understood that the head is formed by a pair of suitable dies, one of which forms the annular face, and the other the flat outer face, the edge face 17 being the result of the displacement of the metal between the dies.

Fig. 3 shows in section, portions of the head-forming dies, which include an outer die having a flat face 1, and an inner die having an annular face 2. The inner die may be made in two sections which are caused to approach each other and grip the wire. Three successive positions of the outer die are shown by full and dotted lines. A portion of the annular inner face is formed during the movement of the outer die from the outer to the intermediate position, the end of the wire being enlarged to partially form the face 16. The remaining portions of the inner face and of the face 16 are formed during the movement of the outer die to the inner position.

The reëntrant annular inner head face having a minimum diameter equal to that of the shank, and diverging outwardly from the shank enables a head to be formed by dies as described, of a maximum diameter, at least three times the diameter of the shank, the metal being condensed and compacted to impart suitable strength and holding power to the head, and compensate for the narrowness of the edge 17.

I claim:

A wire nail including a circular head, a cylindrical shank and a clenching portion, said head having a flat outer face in a plane at right angles with the shank and a substantially circular edge face, the shank and head being joined by an endwise and laterally displaced condensed and compacted reentrant portion which is joined to the shank and enlarged by a relatively small but progressively increasing inclination to the edge of the head with which it is joined, being substantially tangential to the inner face of said head, whereby sharp edges are avoided, said head being of a diameter approximately three times the diameter of the shank.

In testimony whereof I have affixed my signature.

GEORGE A. CURTIS.

Copies of this patent may be obtained for five cents each, by addressing the "Commissioner of Patents, Washington, D. C."